United States Patent [19]
Magid et al.

[11] Patent Number: 4,711,595
[45] Date of Patent: Dec. 8, 1987

[54] DISMOUNTABLE STRUCTURE

[76] Inventors: Robert Magid, 83 Cholmley Gardens, West Hampstead, London NW6, England; John Choong, 221a Victoria Rise, London SW4, England

[21] Appl. No.: 873,828

[22] Filed: Jun. 9, 1986

Related U.S. Application Data

[63] Continuation of Ser. No. 604,905, Apr. 27, 1984, abandoned.

[30] Foreign Application Priority Data

May 12, 1983 [GB] United Kingdom ................. 8313067
Jan. 24, 1984 [GB] United Kingdom ................. 8402148

[51] Int. Cl.⁴ .......................... F16B 7/10; F16B 21/00
[52] U.S. Cl. .................................... 403/108; 403/205; 403/329; 403/379
[58] Field of Search ............... 403/108, 329, 326, 295, 403/157, 161, 205, 403, 402, 292, 162, 151, 328, 379, 109, 377, 378, 11, 19, 20; 24/625, 613, 595

[56] References Cited

U.S. PATENT DOCUMENTS

| | | | |
|---|---|---|---|
| 859,233 | 7/1907 | Lane | 403/108 |
| 2,080,350 | 5/1937 | Waldron | 403/109 X |
| 2,524,652 | 10/1950 | Dalley | 403/161 |
| 2,594,605 | 4/1952 | Zoppelt | 403/108 |
| 3,233,497 | 2/1966 | McCormick | 403/377 X |
| 3,390,589 | 7/1968 | Tschanz | |
| 3,603,628 | 9/1971 | Smith | 403/329 |
| 3,631,688 | 1/1972 | Quick | 403/316 |
| 3,832,075 | 8/1974 | Arai | 403/328 |
| 3,897,044 | 7/1975 | Tallman | 403/108 |
| 4,078,276 | 3/1978 | Nunes | 403/161 |
| 4,085,763 | 4/1978 | Thomas | 403/108 |
| 4,142,810 | 3/1979 | Lesaint | 24/625 |
| 4,227,594 | 10/1980 | Kluger | 24/573 |
| 4,247,216 | 1/1981 | Pansini | 403/329 |
| 4,311,473 | 1/1982 | Sugimoto | 403/328 X |
| 4,353,661 | 10/1982 | Rüther | 403/295 |
| 4,562,787 | 1/1986 | Adamek et al. | 403/328 |

FOREIGN PATENT DOCUMENTS

| | | | |
|---|---|---|---|
| 680025 | 4/1965 | Belgium . | |
| 870861 | 5/1971 | Canada . | |
| 8020966 | 10/1980 | Fed. Rep. of Germany . | |
| 2240487 | 3/1975 | France . | |
| 398201 | 2/1966 | Switzerland . | |
| 4344 | of 1896 | United Kingdom | 403/329 |
| 490718 | 8/1938 | United Kingdom | 403/157 |
| 1004044 | 9/1965 | United Kingdom . | |
| 1063959 | 4/1967 | United Kingdom . | |
| 2000219 | 1/1979 | United Kingdom . | |
| 0679736 | 8/1979 | U.S.S.R. | 403/328 |

Primary Examiner—Andrew V. Kundrat
Assistant Examiner—Peter M. Cuomo
Attorney, Agent, or Firm—Salter & Michaelson

[57] ABSTRACT

A dismountable structure comprising at least one structural part having a female socket provided with at least one transversely extending first hole and at least one structural part having a male socket provided with at least one transversely extending second hole. The sockets are so sized and shaped that each male socket is receivable in each female socket in a locking position in which at least one second hole is aligned with at least one first hole. The structure including fastening means having at least one resiliently displaceable locking element for interlocking one female socket and one male socket, when they are in the locking position, by at least one locking element extending from inside the male socket through the aligned holes of the two sockets.

15 Claims, 19 Drawing Figures

DISMOUNTABLE STRUCTURE

This application is a continuation of Ser. No. 604,905, filed 4/27/84, now abandoned.

The invention relates to a dismountable structure formed of structural parts, comprising a first part having a female socket and a second part having a male socket, the male socket being insertable into and lockable in the female socket by a fastener. The structure has many applications, one of them being for use as a climbing frame for children.

The aim of the invention is to devise a structure which can be easily assembled and in which the structural parts are safely interlocked by said fasteners which automatically interlock a first part and a second part brought to their correct assembly position, but can be unlocked only with the use of a special tool, thereby discouraging tampering and ensuring security of the assembled structure. The fastener is so designed that its locking elements become visible on the outside of the structure only when the structural parts interlocked thereby are in their correct assembly position and safely interlocked, thereby giving a visual indication of correct assembly. Similarly, incorrect assembly will result in the fastener not being visible on the outside of the structure. The fasteners can therefore be seen to be operational or not, having no intermediate states, such as may be assumed by screws which can appear to be secure but have, in fact, worked loose with protracted use.

This is achieved acccording to the invention by the dismountable structure claimed in claim 1.

The invention will now be described, by way of example, with reference to the accompanying diagrammatic drawings, in which:

FIG. 1 shows a tube 10 connected to an L-shaped connector 20 by means of a fastener.

Figure 2:
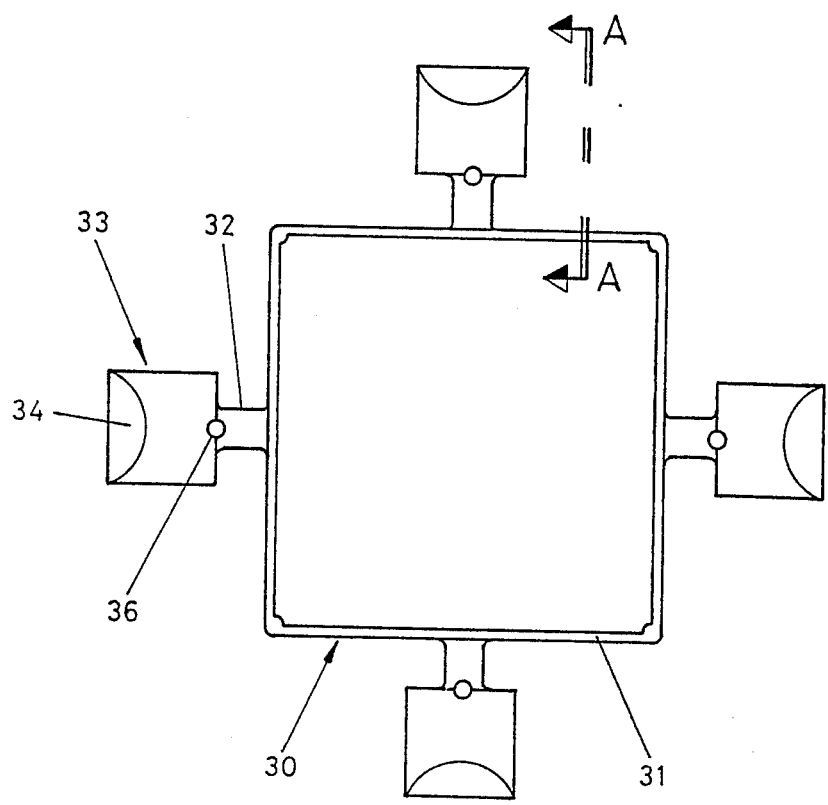
FIG. 2 shows a front elevation of a first embodiment of a fastener.
Figure 3:
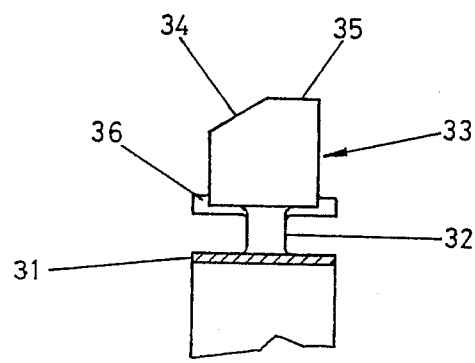
FIG. 3 shows a section along line A—A in FIG. 2.

The fastener 30 shown in FIG. 2 comprises a substantially square-shaped frame 31 which carries in the middle of the outer face of each of its sides a neck 32 supporting a substantially cylindrical head 33. As is apparent from FIG. 3, the front portion of each head 33 has on its radially outer end an oblique surface 34 while the rear portion of each head 33 extends radially along its whole length and ends at a transverse surface 35. The frame 31 is relatively thin and made of a resilient material, so that its sides can readily collapse and the heads 33 can be deflected towards the center of the frame 31 and return, on being released, to their initial position. Each head 33 carries at its bottom a stop 36.

Figure 4:
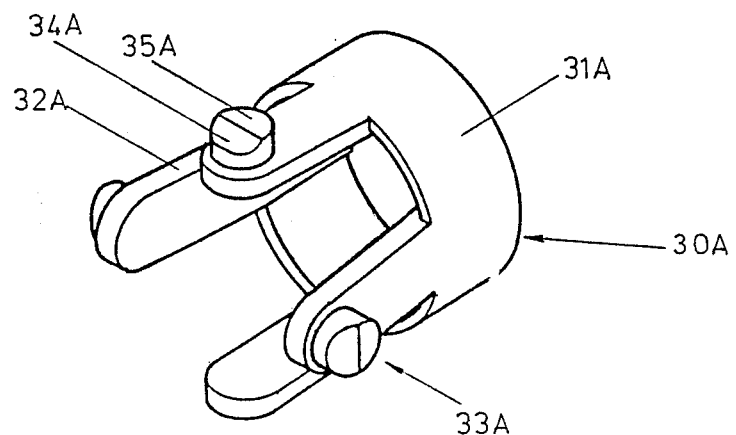
FIG. 4 is a perspective view of a second embodiment of a fastener.

The fastener 30A shown in FIG. 4 is of a crown appearance and is substantially symmetrical with respect to an axis. It has a base formed by a ring 31A from which extend four arms 32A spaced 90° from each other around the periphery of the ring 31A. Each arm 32A carries at its free end a head 33A which is substantially the same as the head 33, except that the head 33A has no neck and no stop. The fastener 30 is preferred to the fastener 30A, and only the former will therefore be referred to in the following text.

The L-shaped connector 20 is a two-way connector having a core 21 and two tubular male sockets 23 extending at right angles to each other. The core 21 provides a shoulder 22 at each socket 23. In each socket 23 are made four radial holes 24 spaced through 90° from each other, all at the same distance from the shoulder 22.

Figure 5:
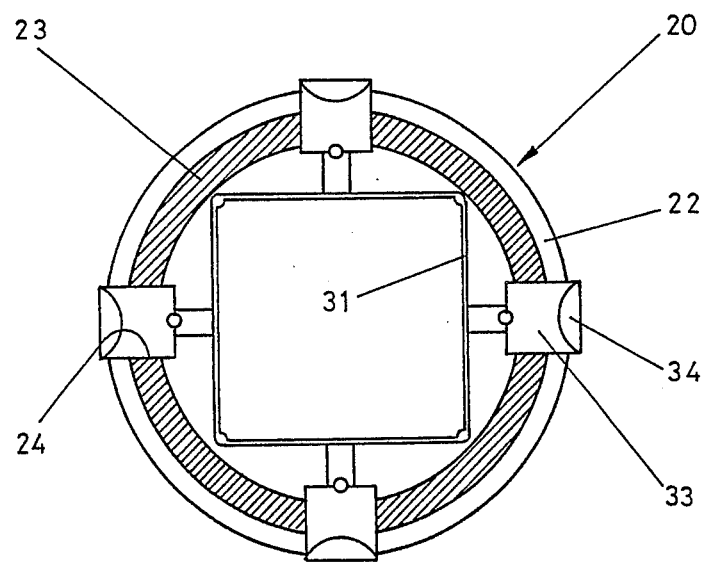
FIG. 5 shows a connector in cross-section with a fastener inserted in it.

In practice one fastener 30 is inserted in each socket 23 of the connector 20 such that the heads 33 of the fastener 30 pass through the holes 24 and protrude to an extent limited by the stop 36 above the outer surface of the socket 23 with all the oblique surfaces 34 facing the free end of the socket 23. This can be seen in FIGS. 1 and 5.

The illustrated tube 10 has each of its end portions formed as a tubular female socket in which are made two diametrally opposite holes 11. The distance of the holes 11 from the end face of the tube 10 is substantially equal to the distance of the holes 24 from the shoulder 22.

The tube 10 and the connector 20 are assembled by manually sliding the tube 10 on to one of the sockets 23 of the connector 20 in which is inserted the fastener 30 as described above with reference to FIGS. 1 and 5. The tube 10 is slid so far that its front face contacts the shoulder 22 of the connector 20. At this stage the tube 10 and the socket 23 of the connector 20 are either automatically interlocked by two heads 33 of the fastener 30 inserted in the socket 23 (FIG. 7) or, if they are not, the tube 10 is turned on the socket 23 about their common axis until the tube 10 and the socket 23 are interlocked.

Figure 6:
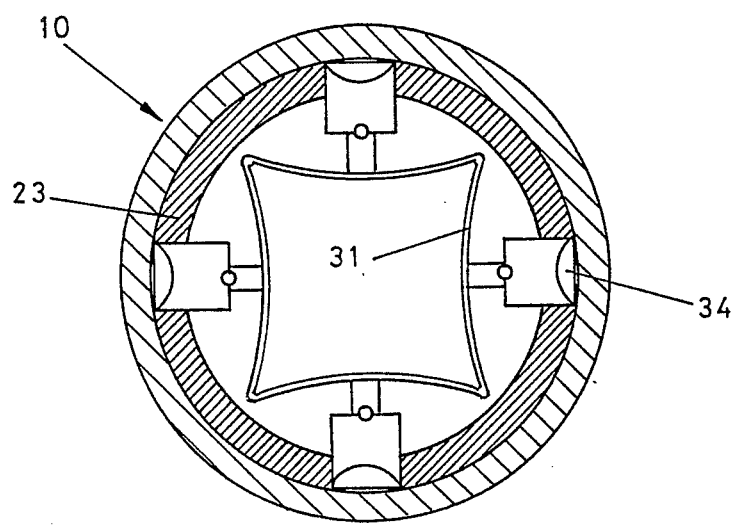
FIG. 6 shows, in cross-section, a connector and a tube partly assembled and a fastener in a position in which it does not interlock the connector and tube.
Figure 7:
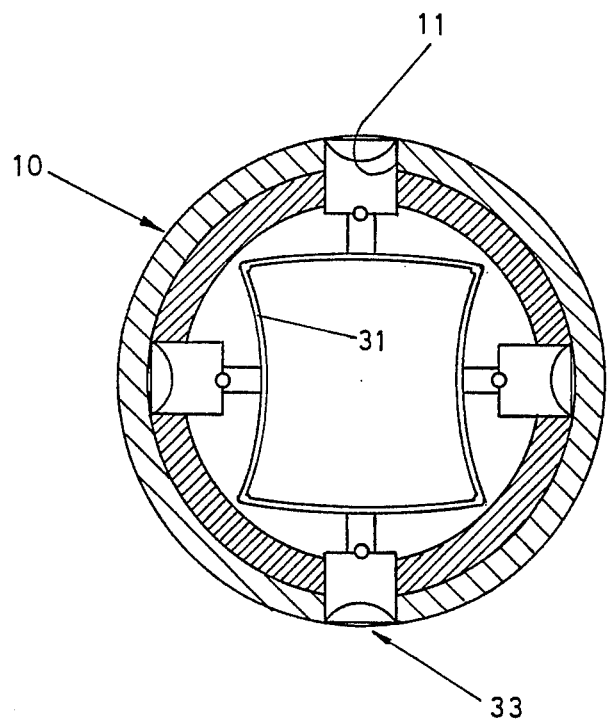
FIG. 7 is the same view as FIG. 6 with the fastener in its locking position.

Interlocking takes place when the socket 23 inside the tube 10 assumes a correct position relative to the tube 10, i.e. a position in which the holes 11 in the tube 10 are aligned with two of the holes 24 in the male socket 23 of the connector 20, in which position two of the heads 33 of the fastener 30 pass through the holes 11 as is shown in FIG. 7. In the process of being slid on to the socket 23 the end of the tube 10 is pressed on to the oblique surfaces 34 of all the heads 33 and depresses the heads 33 to the position shown in FIG. 6.

In the interlocked position two of the heads 33 pass through the aligned holes 11 and 24 as shown in FIG. 7, and are visible on the outside of the two assembled structural parts. In that position the tube 10 is firmly locked in position by said two heads 33 and is prevented by the rear portions of the heads 33 from being slid off the socket 23.

Figure 1:
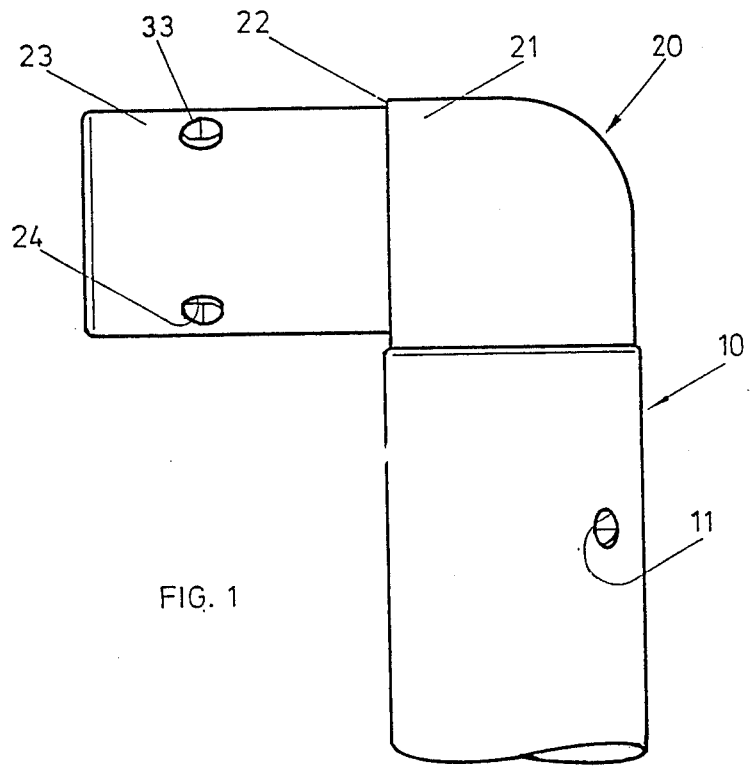
FIG. 1 shows a tube and an L-shaped connector interlocked by a fastener.

As will be apparent from the description of FIGS. 1 to 7, a structure according to the invention comprises a first structural part having a female socket with two holes (in FIG. 1 represented by the tube 10 each end portion of which is in the shape of a female socket and has two holes 11) and a second structural part having a male socket with four holes and containing a fastener (in FIG. 1 represented by the connector 20 which has two male sockets 23, each with four holes 24 and each containing a fastener 30). The two structural parts are interconnected by inserting the male socket into the female socket such that two of the heads of the fastener inside the male socket enter into the two holes of the female socket. Naturally the structure can have any number of structural parts, but to be able to connect one part directly to another part, one of the parts must have a male socket and the other part must have a female socket. Two structural parts having both only male sockets or only female sockets cannot be directly connected to each other without the help of at least one other structural part.

Figure 8:
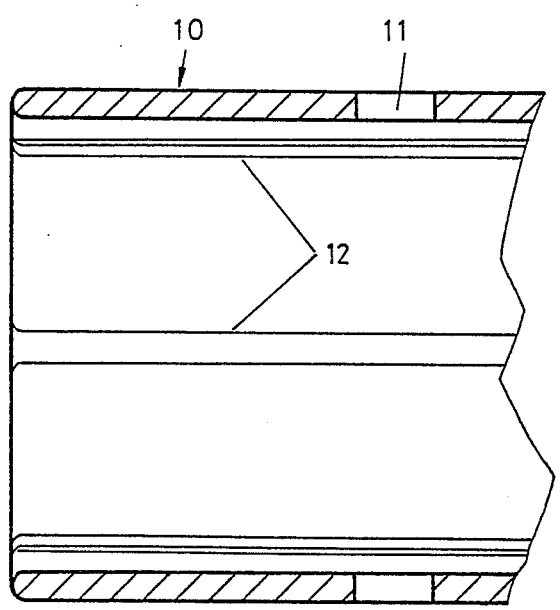
FIG. 8 shows one end of a tube.

A tube 10 according to the invention may have both its outer surface and inner surface smooth. It was however, found advantageous to reduce the wall thickness of each of the end portions of the tube 10 to improve their resilience and thus to facilitate insertion of a male socket therein. This is illustrated in FIG. 8 which shows a tube 10 having six ridges 12 uniformly distributed on its inner periphery. The thickness of the tube wall measured on a ridge corresponds to the overall thickness of the tube, the wall between the ridges is thinner to improve resilience as explained above. It will be understood that similar arrangement can also be made in any of the female sockets. It will further be understood that the thickness of the tube wall between its end portions need not be uniform but might increase from the end portions.

Figure 9:
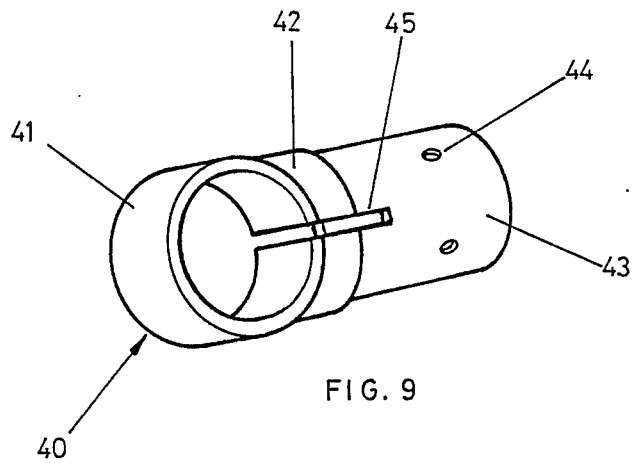
FIGS. 9 and 10 are perspective views of a T-shaped connector.
Figure 10:
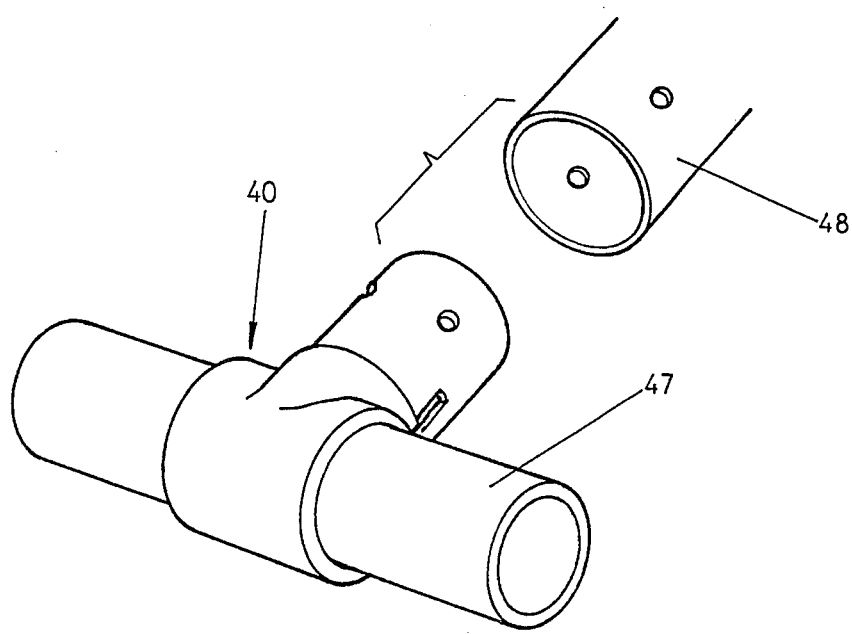
Figure 11:
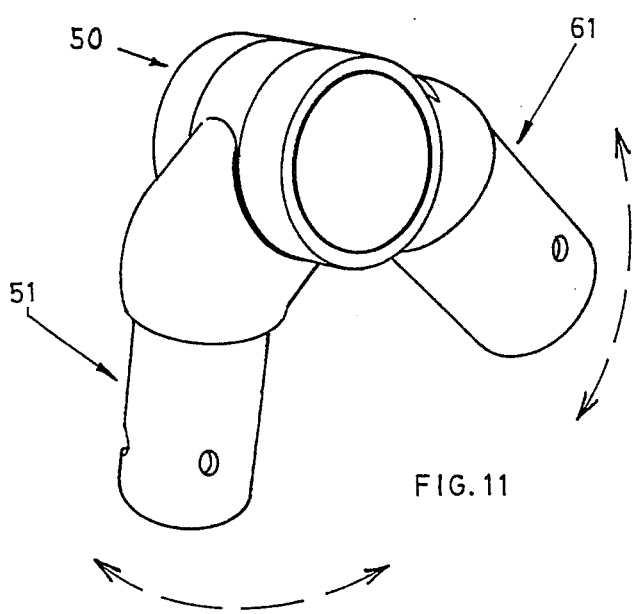
FIG. 11 is a front elevation of a bendable elbow connector.
Figure 12:
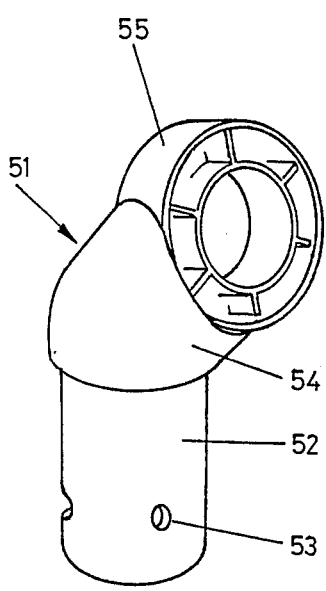
FIGS. 12 and 13 show, respectively, the two arms of the connector shown in FIG. 11.
Figure 13:
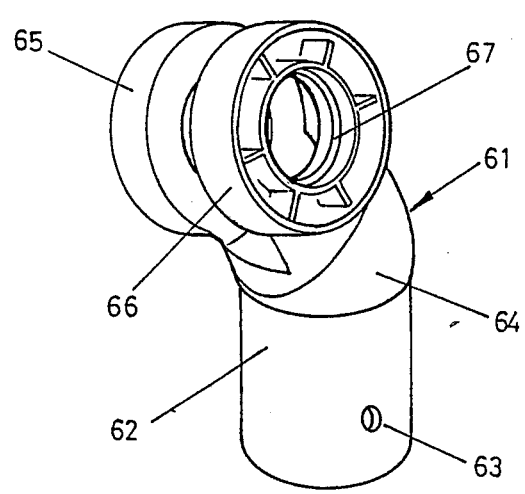
Figure 14:
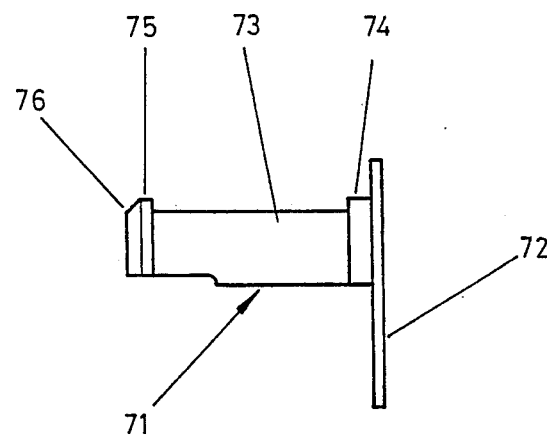
FIG. 14 shows a pin half.
Figure 15:
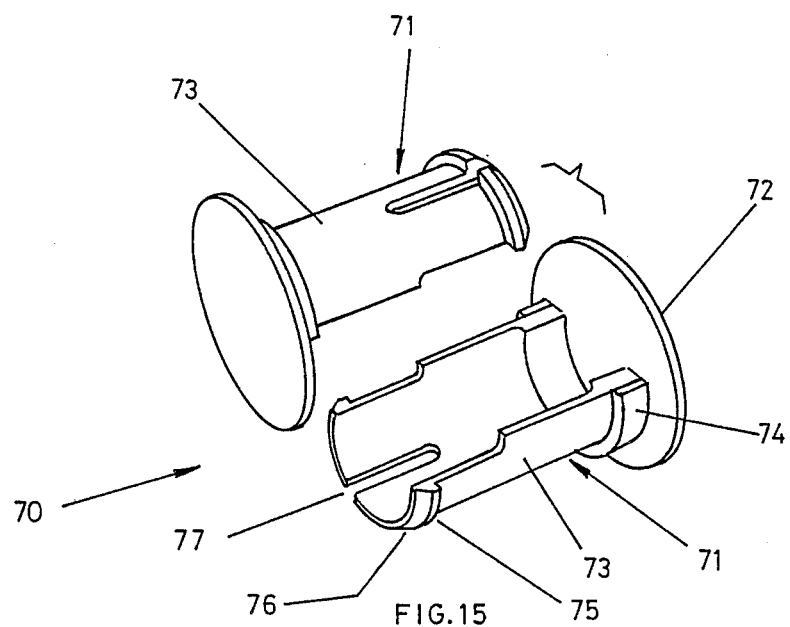
FIG. 15 shows a pivot pin composed of two pin halves shown in FIG. 14.

FIGS. 9 and 10 illustrate a T-shaped connector 40 which consists substantially of a tubular sleeve 41 and a male socket 43 provided with four holes 44 and containing a fastener (not shown). The sleeve 41 and the socket 43 are interconnected by a core 42 the face of which adjacent the male socket 43 defines a shoulder. A slot 45 is made in the connector 40 extending radially through the wall of the tubular sleeve 41, through the core 42, and axially through two diametrally opposite regions of the end portion of the socket 43 adjacent the core 42. Due to the slot 45 the cross-sectional area of the hollow within the tubular sleeve 41 and also the cross-sectional area of the adjacent end portion of the socket 43 are slightly larger than they would be otherwise, and consequently the sleeve 41 can easily be slid over a tube 47 to a required position. When another tube 48 (the end portion of which represents a female socket) is pushed on to the male socket 43 the socket 43 is compressed and with it is compressed also the sleeve 41, whereby the tube 47 is firmly held in position.

FIGS. 11 to 15 illustrate a bendable elbow connector 50 comprising two arms 51 and 61 interconnected by a joint of the type known as knuckle joint.

The arm 51 comprises a male socket 52 provided with four holes 53 and containing a fastener (not shown) of the type described earlier. The socket 52 is at one end connected to a core 54 the face of which, adjacent the socket 52 defines a shoulder. On its side remote from the socket 52 the core 54 carries a centrally positioned eye 55.

The arm 61 comprises a female socket 62 having two holes 63 and connected at one end to a core 64. The opposite end of the core carries two spaced-apart parallel and coaxial eyes 65, 66. Each of the eyes 65, 66 includes an annular inner collar 67.

It will be understood theat both the arms 51, 61 can comprise the same sockets, either male or female.

For assembly the eye 55 of the arm 51 is inserted between the eyes 65, 66 of the arm 61 such that it is coaxial therewith and secured in position by a pivot pin 70, consisting of two identical pin halves 71 inserted from opposite sides to extend through all the three eyes 55, 65, 66, whereby pivotal connection of the arms 51 and 61 is obtained.

Each pin half 71 comprises a flange 72 in the central region of which is pivotally connected a trough-shaped, substantially semi-cylindrical web 73. The web 73 has at its end adjacent the flange 72 a first outside shoulder 74 which is substantially semi-cylindrical. A portion of the opposite end of the web 73 is reduced in size to be slightly less than semi-cylindrical and carries a second outside shoulder 75 which is part-cylindrical and ends in a slanted portion 76 which is substantially part-frustoconical. An axial slit 77 passes through the middle of the reduced end portion of the web 73 and dividing thus said end portion into two mirror-symmetrical endpieces.

Each pin half 71 is made of a resilient material allowing the end pieces to be substantially radially deflected by outside forces and return to their original position when the outside forces cease to act. The slanted portion 76 facilitates insertion of the pin halves 71 through the eyes 55,65,66. When the pin halves 71 are fully inserted the inner collars 67 of the eyes 65,66 are situated between the shoulders 74 and 75, thus preventing the pin halves 71 from being withdrawn therefrom.

Figure 16:
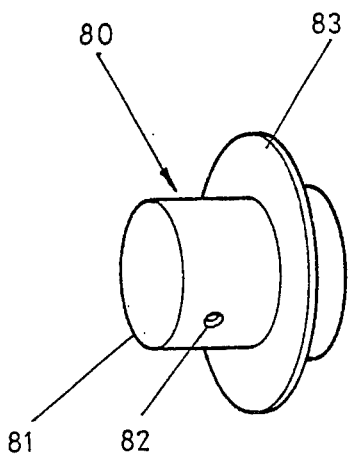
FIGS. 16 and 17 are perspective views of a first part and a second part, respectively, of a stub axle.
Figure 17:
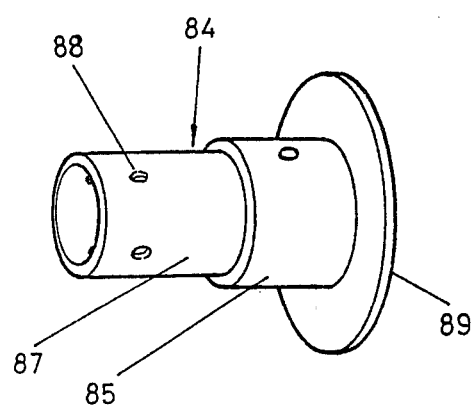

FIGS. 16 and 17 shows, respectively, a first and a second part of a stub axle. The first part 80 is formed by a female socket 81 having two holes 82, which is closed at one end and open at the other and carries a collar 83. The second part 84 comprises a female socket 85 with two holes which has at one end a male socket 87 with four holes 88 and at the other end a collar 89. A fastener (not shown), such as the fastener 30, is inserted in the male socket 87.

Figure 18:
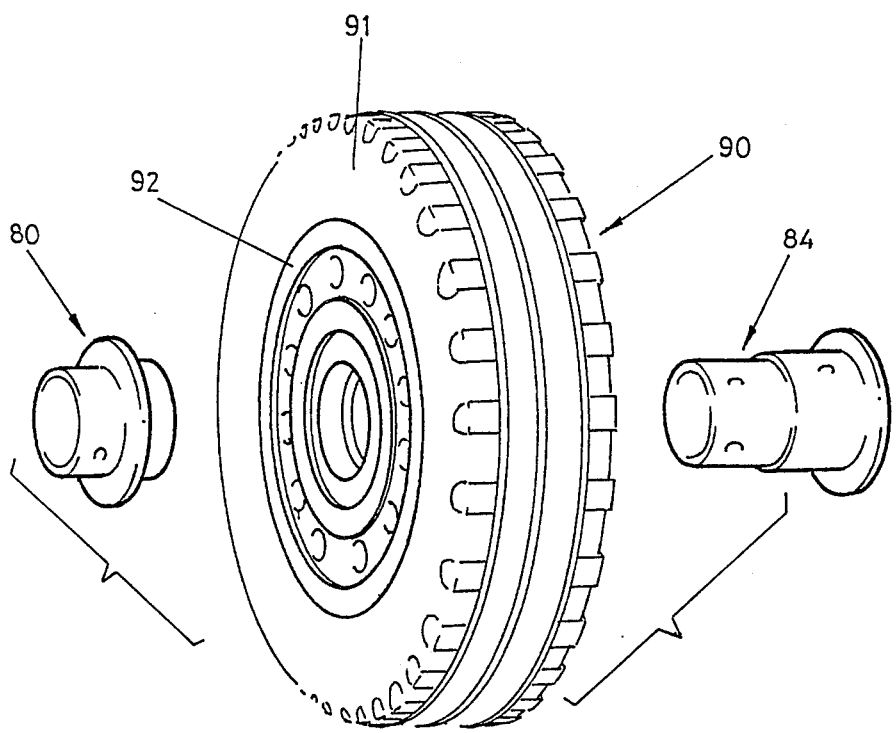
FIG. 18 is an exploded view of the two parts shown in FIGS. 16 and 17 and a wheel carried thereby.

FIG. 18 shows a wheel 90 comprising an imitation tire part 91 and a flange 92 having a tubular portion (not shown) passing through the tire part 91. For mounting the wheel 90 on the stub axle the first part 80 of the stub axle is inserted into the tubular part of the flange 92 from one side and the second part 84 from the other side, so that the male socket 87 of the second part 84 enters the female socket 81 of the first part 80 and is locked therein by the fastener. The stub axle can be attached to another structural part having a male socket including a fastener, by the female socket 85 of the second part 84 being slid on said male socket of said other structural part.

Figure 19:
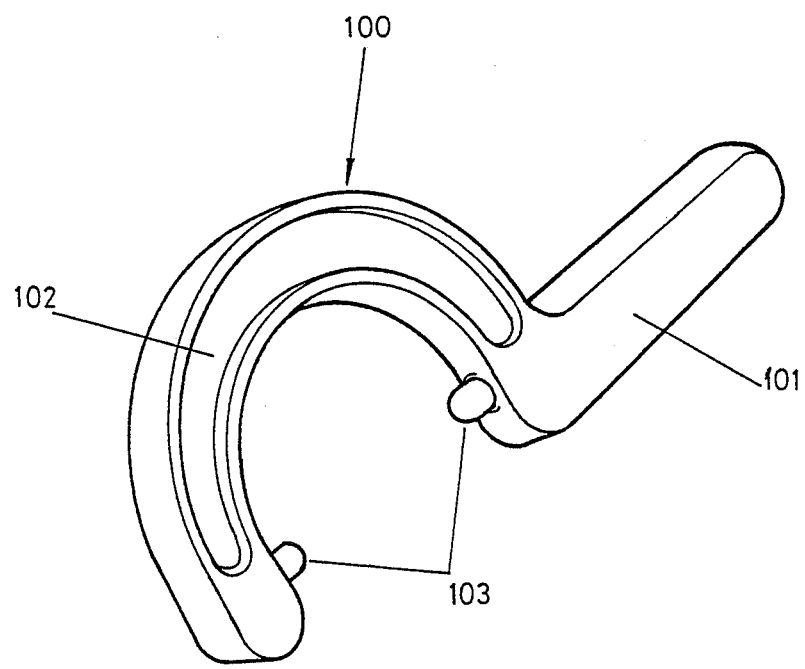
FIG. 19 shows a tool for unlocking the fastener.

A special tool is needed for unlocking the fastener 30 or 30A. One embodiment of such a tool 100 is illustrated in FIG. 19. The tool 100 has a handle 101 carrying a curved jaw 102 which has on its inner side two diametrally opposite pins 103. In the illustrated embodiment the pins 103 are substantially in the form of two coaxial stub cylinders with rounded free ends spaced from each other by a distance corresponding to the diameter of the outer surface of a male socket. The illustrated tool is made of a resilient material, so that when the jaw is pressed on to a female socket the jaw 102 opens such that the pins 103 are spaced from each other through a distance equal to the outer diameter of a female socket. In the latter position the tool is applied so that the pins 103 are aligned with the heads 33 of the fastener 30 in the holes of a male socket, in which position the jaw 102 closes by its own resilience and the pins 103 compress the heads 33 and themselves enter into the holes in the female socket, thus forcing the heads 33 from the holes in the female socket thereby unlocking the male and female socket. The female socket can then be slid on the male socket by manually pulling the two sockets away from each other.

Various modifications are possible within the scope of the appended claims. For instance, while only structural parts having one or two sockets were described, a structural part can have more sockets, e.g. three or four, at various angular dispositions. Also instead of having a single set of four holes accommodating a single fastener, a male socket can have e.g. two axially spaced-apart sets of four holes, each with its own fastener, and the female socket, which is to be interlocked therewith, may have two correspondingly arranged sets of two holes; naturally a female socket with only one set of holes can be used with a male socket with two sets of holes and two fasteners, in which case the second fastener is not used and may be removed. Also, while all the described sockets are annular in cross-section, they could be, for instance square-shaped or polygonal, e.g. octagonal. Also the tube described can have axial recesses or ridges on its inner and/or outer surface or be of a cross-section other than substantially annular, e.g. polygonal, and both end portions of a tube could be made into a male socket, or one into a male and the other into a female socket.

All the described and illustrated structural elements are preferably made of plastics.

We claim:

1. A dismountable structure comprising a first structural part including a tubular female member having a pair of diametrically opposed first holes therein and a second structural part including a tubular male member having two pairs of diametrically opposed second holes therein, said second holes being disposed in a common radial plane with the holes in each pair of second holes being circumferentially spaced from the holes in the other pair of second holes, said members being dimensioned and configured so that said male member is alternatively receivable in said female member in a first locked position wherein one of said pairs of second holes is aligned with said first holes and a second locked position wherein the other pair of said second holes is aligned with said first holes, fastening means in said male member for alternatively securing said male and female members in said first or second locked positions, said fastening means comprising a resilient carrier having two pairs of diametrically opposed locking elements, said locking elements being resiliently, inwardly displaceable and being aligned with and received in said second holes, one pair of said locking elements extending into said first holes when said members are received in said first locked position but being resiliently displaced to a position wherein they resiliently engage the inner surface of said female member when said members are in said second locked position, the other pair of said locking elements engaging the inner surface of said female member when said members are received in said first locked position but extending into said first holes when said members are received in said second locked position.

2. In the dismountable structure of claim 1, said carrier comprising a substantially square-shaped frame including four connected, resiliently, radially deflectable frame sides, one of said locking elements being mounted on each of said frame sides.

3. In the dismountable structure of claim 1, said locking elements being disposed in a common radial plane.

4. In the dismountable structure of claim 1, each of said locking elements having a first surface which is oblique to said radial plane and a second surface which is substantially perpendicular to said radial plane, said oblique surfaces facing generally outwardly and toward the proximal end of said male tubular member, whereby said locking elements are automatically displaced inwardly as said male member is inserted into said female member but one pair of said locking elements must be depressed to remove them from said first holes in order to disengage said male member from said female member.

5. In the dismountable structure of claim 1, at least one of said locking elements comprising a stop for limiting the penetration thereof into the respective second hole aligned therewith.

6. In the dismountable structure of claim 1, said male tubular member and said female tubular member being of substantially circular cross section.

7. The dismountable structure of claim 1 further comprising means for limiting the maximum insertion of said male member into said female member.

8. In the dismountable structure of claim 1, at least one of said male and female members having a plurality of recesses therein to reduce the thickness thereof and increase the resiliency thereof.

9. In the dismountable structure of claim 1, one of said structural parts comprising a tubular sleeve, the respective male or female tubular member of said one of said structural parts extending at a substantially right angle to said tubular sleeve.

10. In the dismountable structure of claim 1, said carrier being of ring-shaped configuration.

11. In the dismounable structure of claim 1, said carrier comprising a ring-shaped element and a plurality of arms extending from said ring-shaped element, said locking elements being disposed on said arms.

12. In combination, a dismountable structure comprising a first strucural part including a tubular female member and a second structural part including a tubular male member, one of said members having one pair of transversely extending diametrically opposed first holes therein, the other pair of said members having two pairs of transversely extending diametrically opposed second holes therein, said second holes being disposed in a common radial plane with the holes in each pair of second holes being circumferentially spaced from the holes of the other pair of second holes, said members being dimensioned and configured so that said male member is alternatively in said female member in a first locked position wherein one of said pairs of second holes is aligned with said pair of first holes and a second locked position wherein the other pair of said second holes is aligned with said pair of first holes, fastening means in said male member for alternatively securing said male and female members in said first and second locked positions, said fastening means comprising a resilient carrier having a plurality of locking elements on said carrier, one of said locking elements being received in each of said holes in said male member, said locking elements being resiliently inwardly displaceable and being aligned with and received in both said first holes and the respective pair of second holes aligned therewith in each of said first and second locked positions, and a tool for disengaging said fastening elements from said female member, said tool comprising a pair of diametrically opposed pins which are simultaneously engageable with the locking elements received in the aligned holes in said male and female members for depressing said fastening elements inwardly to disengage them from said female member.

13. In the combination of claim 12, said tool further comprising a resiliently openable jaw, said pins being mounted on said jaw and being movable therewith for inserting said pins into the aligned holes in said female member.

14. In the combination of claim 12, said first holes being disposed in said female member, said second holes being disposed in said male member, said fastening means comprising four of said fastening elements, one pair of said fastening elements engaging the inner surface of said female member in each of said first and second locked positions.

15. In the combination of claim 12, said carrier comprising a substantially square-shaped frame including four connected resiliently, radially deflectable frame sides, one of said locking elements being mounted on each of said frame sides.

* * * * *